(12) United States Patent
Zhou et al.

(10) Patent No.: US 8,477,571 B1
(45) Date of Patent: Jul. 2, 2013

(54) HEAT ASSISTED MAGNETIC RECORDING USING SURFACE-EMITTING DISTRIBUTED FEEDBACK LASER

(75) Inventors: Delai Zhou, Maple Grove, MN (US); Tim Rausch, Farmington, MN (US); Lifu Zhou, Eden Prairie, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/431,184

(22) Filed: Mar. 27, 2012

(51) Int. Cl.
*G11B 11/00* (2006.01)

(52) U.S. Cl.
USPC .............. 369/13.33; 369/13.13; 369/112.27

(58) Field of Classification Search
USPC .......... 369/13.33, 13.32, 13.24, 13.14, 13.03, 369/13.02, 13.12, 13.13, 13.01, 13.35, 13.17, 369/112.27, 300; 360/59, 125.31, 125.74
See application file for complete search history.

(56) References Cited

U.S. PATENT DOCUMENTS

| | | | |
|---|---|---|---|
| 6,771,589 B2 | 8/2004 | Ueyanagi et al. | |
| 6,834,027 B1 | 12/2004 | Sakaguchi et al. | |
| 6,944,112 B2 | 9/2005 | Challener | |
| 7,133,230 B2 | 11/2006 | Saga et al. | |
| 7,483,229 B2 | 1/2009 | Rausch et al. | |
| 7,586,970 B2 | 9/2009 | Kanskar et al. | |
| 7,643,248 B2 | 1/2010 | Sluzewski | |
| 7,839,497 B1 | 11/2010 | Rausch et al. | |
| 7,852,713 B2 | 12/2010 | Nishida et al. | |
| 7,864,635 B2 | 1/2011 | Shimizu | |
| 8,014,434 B2 * | 9/2011 | Behfar et al. | 372/96 |
| 8,064,493 B2 * | 11/2011 | Behfar et al. | 372/43.01 |
| 8,254,212 B2 * | 8/2012 | Snyder et al. | 369/13.33 |
| 2009/0067465 A1 | 3/2009 | Behfar et al. | |
| 2010/0316076 A1 | 12/2010 | Behfar et al. | |
| 2010/0328807 A1 | 12/2010 | Snyder et al. | |
| 2011/0243176 A1 | 10/2011 | Mooney et al. | |

OTHER PUBLICATIONS

Kanskar et al., "Novel Grating Boosts Brightness", Compound Semiconductor, Jun. 2009, pp. 21-23.

* cited by examiner

*Primary Examiner* — Ali Neyzari
(74) *Attorney, Agent, or Firm* — Hollingsworth Davis, LLC

(57) ABSTRACT

A device includes a body, a waveguide, and a near field transducer (NFT). The body has opposed first and second surfaces. The waveguide is adapted to receive light and convey the light to a distal end of the waveguide. The NFT is disposed proximate the distal end, and it has an output end proximate the first surface of the body. The device further includes a surface-emitting distributed feedback (SE-DFB) laser that is mounted on and attached to the body and positioned to inject laser light into the waveguide. The device may be a recording head, and the laser, the waveguide, and the NFT may cooperate to provide electromagnetic heating to a substrate for heat assisted magnetic recording.

20 Claims, 11 Drawing Sheets

US 8,477,571 B1

HEAT ASSISTED MAGNETIC RECORDING USING SURFACE-EMITTING DISTRIBUTED FEEDBACK LASER

BACKGROUND

This invention relates generally to recording technology, with particular application to heat assisted magnetic recording (HAMR), and to associated articles, systems, and methods. A HAMR device may be used in a hard disk drive that includes a magnetic recording medium adapted to overcome superparamagnetic effects that might otherwise limit the areal data density of other types of magnetic media. In order to record information in this medium, the HAMR device may locally heat a small portion of the recording medium which is also exposed to a magnetic write field of a selected polarity generated by a magnetic write head. The local heating provided by the HAMR device allows the small portion of the recording medium to take on a magnetization that is the same polarity as the magnetic write field, while neighboring portions of the recording medium adjacent to the small portion may have respective magnetizations that are not changed even though the magnetic write field extends to those neighboring portions. As a technique for locally heating the small portion of the recording medium, others have proposed different combinations of a laser light source and a component known alternatively as a plasmonic antenna, a plasmonic transducer, or a near field transducer. Such component is referred to herein as a near field transducer, which is abbreviated herein as "NFT". The NFT converts some of the power from the laser light into a hot spot whose transverse dimensions are smaller than the diffraction-limited spot size for the laser light, provided the magnetic recording medium is located close enough to the NFT.

BRIEF SUMMARY

The present application discloses, among other things, heads that include a body, a waveguide, a near-field transducer (NFT), and a surface-emitting distributed feedback (SE-DFB) laser. The body may have opposed first and second surfaces. The waveguide may be adapted to receive light and convey the light to a distal end of the waveguide. The NFT may be disposed proximate the distal end and may have an output end proximate the first surface of the body. The SE-DFB laser may be mounted on and attached to the body, and positioned to inject laser light into the waveguide. The device may be a recording head. The laser, the waveguide, and the NFT may cooperate to provide electromagnetic heating to a substrate for heat assisted magnetic recording.

This application also discloses methods that may include: generating laser light from a surface-emitting distributed feedback (SE-DFB) laser; coupling the laser light into a waveguide having a distal end; and delivering the coupled laser light to a near field transducer (NFT) disposed proximate the distal end, the NFT being configured to provide electromagnetic heating in response to the delivered laser light. The SE-DFB laser may be mounted on a head that comprises the waveguide and the NFT, and the NFT may be configured to provide the electromagnetic heating to a medium spaced apart from the head.

This application also discloses systems that may include a surface-emitting distributed feedback (SE-DFB) laser, a waveguide, and an NFT. The waveguide may be coupled to receive laser light from the SE-DFB laser and to convey the laser light to a distal end of the waveguide. The NFT may be disposed proximate the distal end and configured to provide electromagnetic heating in response to the laser light. The system may also include a magnetic write pole disposed proximate the NFT.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 8b is a schematic view along line 8b-8b in FIG. 8a;

In the figures, like reference numerals designate like elements.

DETAILED DESCRIPTION OF ILLUSTRATIVE EMBODIMENTS

Figure 1:
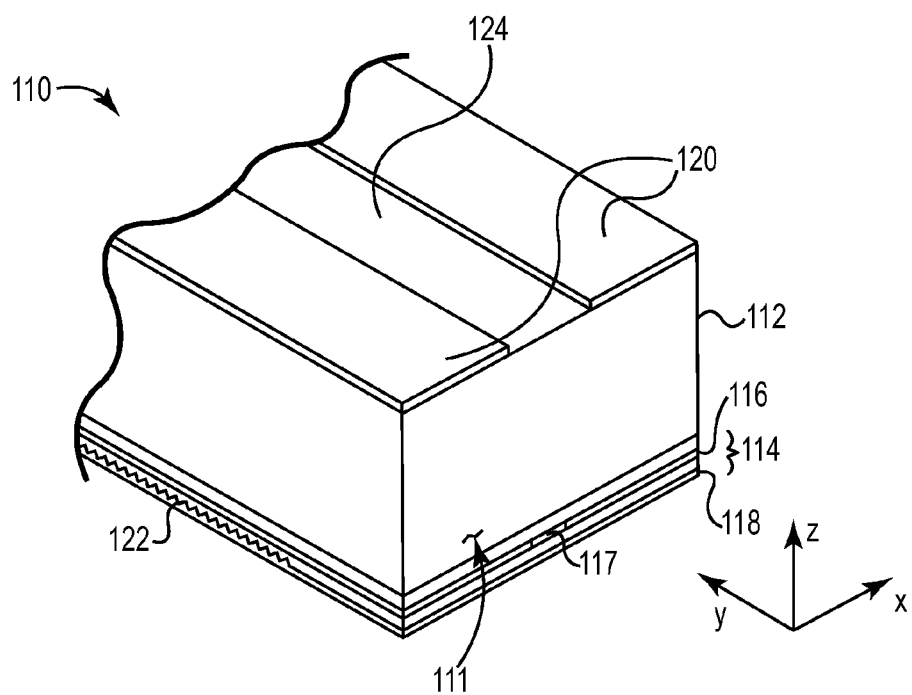
FIG. 1 is a schematic perspective view of a portion of a surface emitting distributed feedback (SE-DFB) semiconductor laser.

We have developed heads such as recording heads in which a particular type of semiconductor laser is incorporated into the head by attachment to a body such as a slider. The type of laser is a surface emitting distributed feedback (SE-DFB) laser. Such lasers can in some cases produce more optical power in a single spatial mode than other types of semiconductor lasers that have been proposed for use on recording heads, and can in some cases be mounted to inject that light efficiently into a waveguide with relaxed tolerances, e.g., without the need for a sub-micron positioning tolerance relative to the waveguide along at least one axis.

The head may also include a waveguide and a near field transducer (NFT). The waveguide may be adapted to receive light and convey the light to a distal end of the waveguide. The NFT may be disposed proximate the distal end, and may have an output end proximate a first surface of the body. Light from the laser may be coupled into the waveguide (which may be or comprise a solid immersion mirror (SIM) having a focal region at the distal end, or it may be or comprise a channel waveguide) and conveyed to the NFT, where it is converted to near field radiation sufficient to heat a tightly confined portion of a nearby object such as a magnetic recording layer on a substrate. The head may also comprise a write element, including a magnetic write pole that is disposed near the NFT. Heating of the tightly confined portion of the recording layer by the NFT may be sufficient to reduce the coercivity of the heated portion enough so that the magnetic field from the magnetic write pole is able to change the magnetization direction of the recording layer in the confined heated region.

Semiconductor lasers may be incorporated into a head such as a recording head to provide coherent light to an NFT such as a plasmonic transducer for heat assisted magnetic recording (HAMR) or optical magnetic recording. In such systems, optical energy from the laser may be used indirectly to locally heat a recording medium in order to reduce coercivity of the medium so that an applied magnetic field can more easily change the magnetization of the recording medium during the temporary magnetic softening of the medium caused by the heating. The size of the locally heated portion of the recording medium may be used to determine the data bit dimension. Optical energy from the laser is typically coupled into a waveguide and directed towards an NFT, which converts the optical energy to electromagnetic energy in a tightly confined spot close to an output end of the NFT. Assuming the head is disposed sufficiently close to the recording medium, the high power density in the confined spot can heat a corresponding small spot of the recording medium to reduce the coercivity of the small heated portion. While still heated, the small portion may be exposed to a magnetic field that sets or controls the direction of magnetization of the heated portion. In this manner the coercivity of the medium at ambient temperature can be much higher than the coercivity during recording, thus allowing for stability of the recorded bits at much higher storage densities and with much smaller bit cells.

Challenges may be encountered in establishing an efficient, reliable, and low cost design for efficiently coupling the output of a semiconductor laser to the NFT via the waveguide. Some of these challenges may be due to differences in how light is guided through the laser compared to how light is guided through the (passive) waveguide. Adding to these challenges is the fact that it is often desirable, for optimal operation of the NFT, to illuminate the NFT with laser light of a single spatial mode. Furthermore, the degree to which laser light can be efficiently coupled from the laser to the waveguide may depend on the positional tolerances associated with the two components.

Certain types of surface-emitting semiconductor lasers are particularly well suited for use in recording head applications and the like. Surface-emitting semiconductor lasers in general are well suited for these applications because alignment of such a laser to a waveguide incorporated into a head may be achieved, in large part, by lateral control of the position of the semiconductor laser on the head, rather than by more difficult vertical control of the laser on the head. Furthermore, within the group of surface-emitting lasers, a smaller group or class known as surface-emitting distributed feedback (SE-DFB) lasers are of particular utility. The SE-DFB lasers can in many cases provide more optical power in a single spatial mode than other types of surface-emitting semiconductor lasers, particularly when dealing with laser packages small enough to be compatible with recording head applications. Also, the emitting region of an SE-DFB semiconductor laser can be made to be elongated along a transverse axis in order to better couple to an elongated input region or edge of a passive waveguide, and positional tolerances along at least the axis of elongation may be relaxed as a result. SE-DFB lasers can thus be of particular utility when mounted to a head such as a recording head to inject laser light efficiently into a waveguide for delivery to an NFT, and positional tolerances of the laser relative to the waveguide may be relaxed along at least one axis.

FIG. 1 shows a schematic perspective view of a portion of a surface emitting distributed feedback (SE-DFB) semiconductor laser 110. The laser 110 is illustrated in the context of a Cartesian coordinate system for reference purposes. The laser 110 may be fabricated using solid state batch processing on a larger wafer scale, and after processing the wafer may be diced or otherwise subdivided into a multitude of smaller devices, one of which is the laser 110. The relatively thick substrate 112 may be the diced portion of an initial crystalline wafer on which a plurality of thin layers 114 (e.g., layers whose thicknesses are on the order of about one micron or less) are grown, deposited, and/or patterned on a side of the wafer using, for example, photolithography and chemical, plasma, or other etching processes. These layers 114 may include a layer of gain medium 116 which may form one or more quantum wells with adjacent layers, and a p-contact 118. An n-contact 120 may be deposited or otherwise formed on an opposite side of the substrate 112. The distribution of electrical current flow between the n-contact 120 and p-contact 118 may define an active region 117 of the gain medium. Laser light may propagate within the laser 110 generally along the active region 117 between a first facet or end 111 of the laser 110 and an opposite facet or end (not shown), i.e., generally parallel to the y-axis.

Unlike an edge-emitting laser, the SE-DFB laser 110 does not emit laser light primarily from the end-facet 111. Instead, an output grating 122 is provided to couple light out of an extended output window 124. The grating 122 is fabricated into or proximate the gain medium 116. The grating 122 is distributed along at least a portion of the active region 117 between the end facets, and it provides optical feedback into the gain medium 116 to facilitate lasing, as well as to couple light out of the laser 110 through the substrate 112 and output window 124. The grating 122 thus ensures that the laser 110 is a "distributed feedback" surface-emitting laser. Note that the substrate is transparent to light of the laser wavelength.

The design of the output grating 122 can be tailored to steer and focus (to at least some extent) the light from the laser as it exits the output window 124. The grating 122 may be or comprise a curved second-order grating, or it may be or comprise another suitable type of grating. FIGS. 2a through 2d show in simplified form various beam geometries that may be produced by SE-DFB lasers.

Figures 2A, 2B:
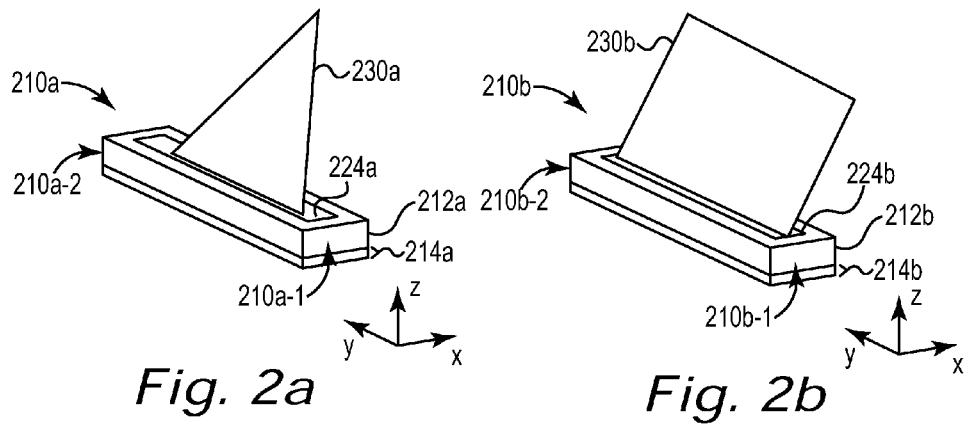
FIGS. 2a through 2d are schematic perspective views of SE-DFB lasers, showing in simplified form various beam geometries that may be produced by such lasers.

In FIG. 2a, a solid state SE-DFB laser 210a includes a substrate 212a on which is disposed a plurality of thin layers 214a. The layers include a quantum well structure comprising a layer of gain medium, and an output grating fabricated into or proximate the gain medium. The grating is distributed along at least a portion of the active region between end facets at ends 210a-1, 210a-2. The grating provides optical feedback into the gain medium, and couples light out of the laser through the substrate 212a and the output window 224a. The grating is tailored to provide a focused output beam 230a.

In FIG. 2b, a solid state SE-DFB laser 210b includes a substrate 212b on which is disposed a plurality of thin layers 214b. The layers include a quantum well structure comprising a layer of gain medium, and an output grating fabricated into or proximate the gain medium. The grating is distributed along at least a portion of the active region between end facets at ends 210b-1, 210b-2. The grating provides optical feedback into the gain medium, and couples light out of the laser through the substrate 212b and the output window 224b. The grating is tailored to provide a substantially uniform collimated output beam 230b.

Figures 2C, 2D:
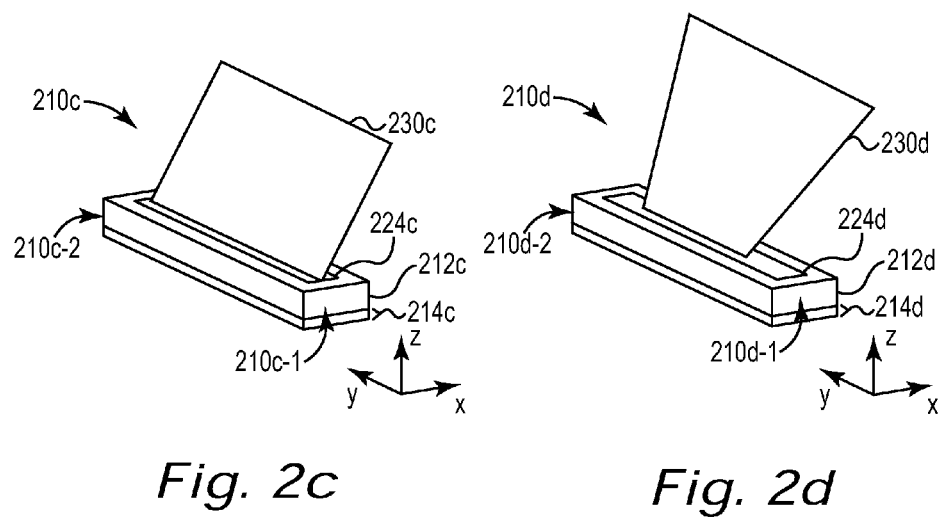

In FIG. 2c, a solid state SE-DFB laser 210c includes a substrate 212c on which is disposed a plurality of thin layers 214c. The layers include a quantum well structure comprising a layer of gain medium, and an output grating fabricated into or proximate the gain medium. The grating is distributed along at least a portion of the active region between end facets at ends 210c-1, 210c-2. The grating provides optical feedback into the gain medium, and couples light out of the laser through the substrate 212c and the output window 224c. The grating is tailored to provide a substantially collimated output beam 230c that, unlike beam 230b of FIG. 2b, is non-uniform in brightness or flux as a function of position along the output window.

In FIG. 2d, a solid state SE-DFB laser 210d includes a substrate 212d on which is disposed a plurality of thin layers 214d. The layers include a quantum well structure comprising a layer of gain medium, and an output grating fabricated into or proximate the gain medium. The grating is distributed along at least a portion of the active region between end facets at ends 210d-1, 210d-2. The grating provides optical feedback into the gain medium, and couples light out of the laser through the substrate 212d and the output window 224d. The grating is tailored to provide a substantially uniform diverging output beam 230d.

In addition to the beam steering/focusing capabilities, SE-DFB lasers may have one or more of the following design features that may distinguish them from many other types of solid state lasers: facet coatings may be omitted; coupling optics may be much simpler; and the SE-DFB laser devices may be tested "on chip" before the wafer is diced, which may lead to higher production yields.

The output grating, and hence the output beam of the SE-DFB laser, may be designed to provide optimum coupling to the passive waveguide, and optimum coupling to the NFT. Thus, depending on the particular design chosen for the waveguide and for the NFT, the grating and output beam of the SE-DFB laser may be appropriately tailored, e.g., according to any of the embodiments shown in FIGS. 2a through 2d, or otherwise. The type of coupling between the laser and the waveguide may also impact the design of the output grating and output beam. For example, if the laser is end-fire coupled to the waveguide, the laser injects light into an edge of the waveguide, the edge typically being long and narrow and serving to connect two opposed major surfaces of the waveguide. In this case, the output grating of the laser may be designed to emit the output beam from an output window that is long and narrow, e.g. as shown in FIGS. 2a-2d, to match the long narrow edge of the waveguide. Alternatively, if the laser is mounted to inject light through one of the major surfaces of the waveguide, e.g. using a coupler grating disposed on or near the waveguide major surface, the output grating of the laser may be designed with a different aspect ratio than is shown in FIGS. 2a-2d in order to emit the output beam from an output window that is extended in two orthogonal in-plane (transverse) directions such that it more closely resembles an area source than a line source.

Figure 3:
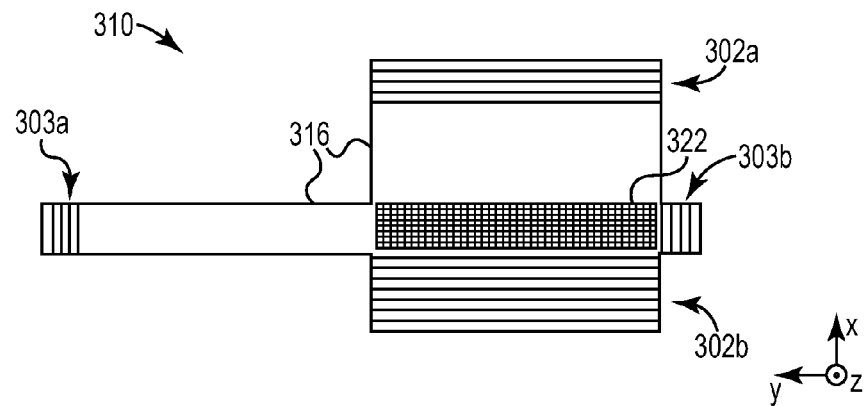
FIG. 3 is a schematic top or plan view of an SE-DFB laser.

Another SE-DFB semiconductor laser 310 is shown schematically in FIG. 3. In this case, the laser 310 includes a layer of gain medium 316 bounded as shown by multilayer mirrors 302a, 302b, 303a, 303b, which may be or comprise first order distributed Bragg reflectors. The number, composition, and thickness of the individual layers making up each of these multilayer mirrors may be selected to provide high reflectivity at the laser wavelength. The mirrors 302a, 302b define a first resonator cavity in which light can bounce back and forth along the x-axis. The mirrors 303a, 303b define a second resonator cavity in which light can bounce back and forth along the y-axis. An output grating 322 provides optical feedback into the gain medium, and couples light out of the laser through the substrate and an output window, the output window being about the same size and shape as the outer boundary of the grating 322. The output grating 322, which may also be referred to as a beam shaper, serves as the output coupler for surface emission, and may be a 2-dimensional second order grating that satisfies the following equation in both the x-direction and the y-direction:

$$\Lambda = \lambda/n$$

In this equation, $\Lambda$ is the grating period in the given direction, n is the effective index of refraction of the laser waveguiding structure, and $\lambda$ is the wavelength of the laser light in vacuum. A benefit of the cross resonator laser design of SE-DFB laser 310 is that each of the two cavity lengths (i.e., the first cavity length from mirror 302a to mirror 302b, and the second cavity length from mirror 303a to mirror 303b) can be made substantially shorter than L, where L represents the length of a so-called one-dimensional or linear cavity laser (such as the linear cavity laser depicted in FIG. 1) having an output power equal to that of the cross resonator laser. In exemplary embodiments, the output grating 322 is tailored to achieve single mode operation for the output beam. If the transverse cavity dimension (width) for a given resonator cavity is relatively large, e.g., on the order of 20 to 60 micrometers, the grating features may be curved to provide the single mode operation (although in some cases such grating features may be straight and not curved). If on the other hand the transverse cavity dimension (width) for a given resonator cavity is relatively small, e.g., on the order of 5 micrometers or less, the grating features may be substantially linear to provide the single mode operation. The output grating 322 of laser 310 may therefore have linear and/or curved grating features. Depending on the dimensions of the grating 322 along the x- and y-directions, and the aspect ratio of the grating 322, a single mode output beam may be emitted from the output window, and the output beam may be made to resemble a line source, a point source, or an area source.

Figure 4:
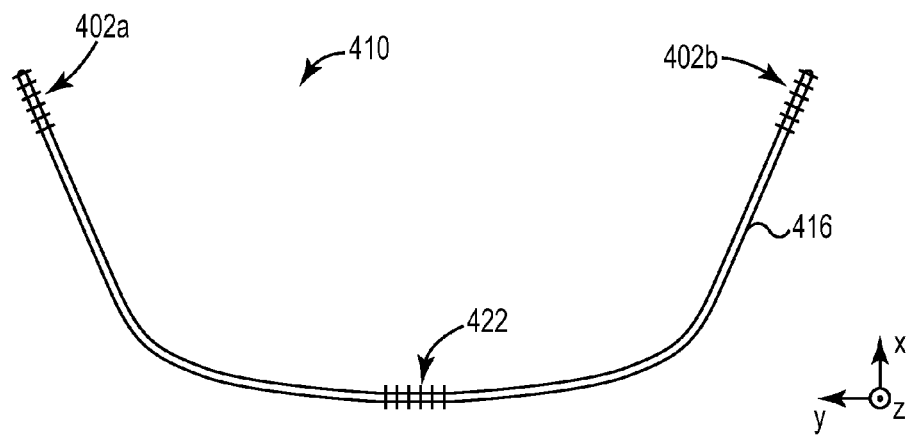
FIG. 4 is a schematic top or plan view of another SE-DFB laser.

Another SE-DFB semiconductor laser 410 is shown schematically in FIG. 4. The laser 410 includes a layer of gain medium 416 bounded by lower refractive index cladding material. The long, narrow shape of the gain medium is characteristic of a one-dimensional or linear cavity design, even though the shape is gently curved in the form of a "U". Care may be taken in the design of the curved shape to keep losses low, e.g. by employing curves that are gradual. The gain medium 416 is bounded on its ends by multilayer mirrors 402a, 402b. Similar to the mirrors of FIG. 3, mirrors 402a, 402b may be or comprise first order distributed Bragg reflectors tailored to provide high reflectivity at the laser wavelength. The mirrors 402a, 402b define a resonator cavity in which light can bounce back and forth along the path of the gain medium 416 in the x-y plane. The curved or "U" shape of the gain medium 416 allows a long length of gain medium to be employed in a compact space—note that the separation between the mirrors 402a, 402b as measured along an axis parallel to the y-axis is substantially less than the cavity length of the laser, i.e., the path length from mirror 402a to mirror 402b as measured along the gain medium 416. The longer cavity length can be used to increase the gain of the laser and boost the power of the output beam. The cavity length is desirably greater than the cavity length associated with a vertical cavity surface emitting laser (VCSEL). Stated differently, in cases where the SE-DFB laser comprises a plurality of layers formed on a chip substrate, the cavity length of the SE-DFB laser is desirably greater than the overall (maximum) thickness Tmax of such plurality of layers.

The width of the curved strip or ridge forming the gain medium 416 may be chosen to be small enough to achieve single transverse mode operation. A second order output grating 422 is included to provide optical feedback into the gain medium, and to couple light out of the laser through the substrate and an output window, the output window being about the same size and shape as the outer boundary of the grating 422. The grating 422 and associated output window may be tailored to have any desired length, for example, short to provide an output beam made to resemble a point source, or long to provide an output beam made to resemble a line source.

Figure 5:
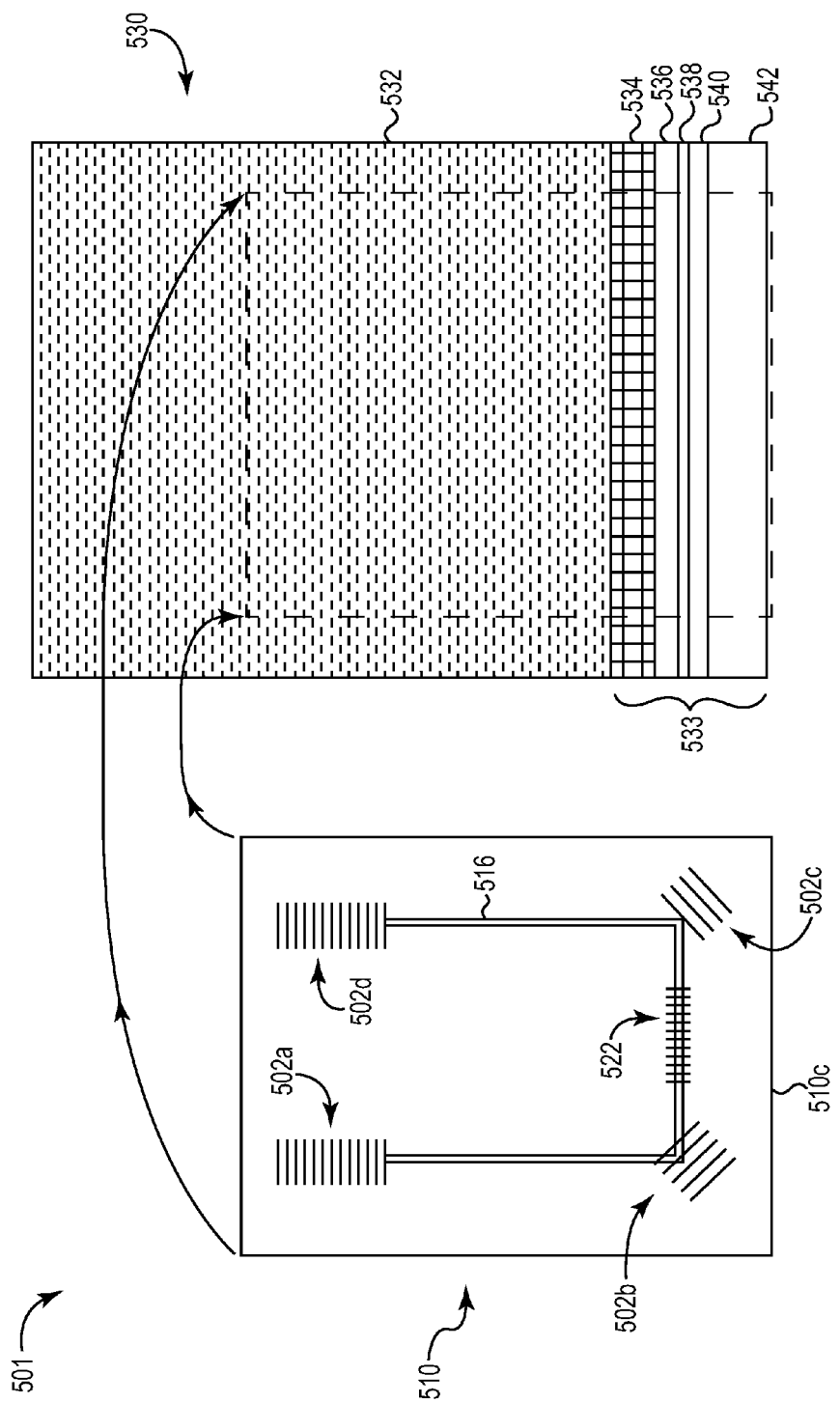
FIG. 5 is a schematic top or plan view of another SE-DFB laser, and a schematic plan view of a body to which the SE-DFB laser can be attached.

Still another SE-DFB semiconductor laser 510 is shown schematically in the system 501 of FIG. 5, together with a body 530 to which the laser can be attached. The laser 510 includes a layer of gain medium 516 bounded by lower refractive index cladding material. The gain medium layer has been etched or otherwise shaped to form long, narrow ridge-like structures characteristic of a one-dimensional or linear cavity design, even though the shape is disjointed into three distinct segments or legs forming a "U". The gain medium 516 is bounded on its ends by multilayer mirrors 502a, 502d. Additional multilayer mirrors 502b, 502c are provided as shown at the junctions between segments or legs of the gain medium to provide low loss coupling between such segments, and a low loss light path between the ends of the gain medium 516. Similar to the mirrors of FIGS. 3 and 4, mirrors 502a, 502d may be or comprise first order distributed Bragg reflectors tailored to provide high reflectivity at the laser wavelength. Additional mirrors 502b, 502c may be or comprise first order distributed Bragg reflectors tailored to provide high reflectivity for obliquely incident (e.g. 45 degree incidence angle) light at the laser wavelength. The mirrors 502a, 502b, 502c, 502d define a resonator cavity in which light can bounce back and forth along the path of the gain medium 516 in the x-y plane. The "U" shape of the gain medium 516 allows a long length of gain medium to be employed in a compact space—note that the minimum in-plane separation between the mirrors 502a, 502d is substantially less than the cavity length of the laser, i.e., the path length from mirror 502a to mirror 502d as measured along the gain medium 516. The longer cavity length can be used to increase the gain of the laser and boost the power of the output beam. If the SE-DFB laser comprises a plurality of layers formed on a chip substrate, the cavity length of the SE-DFB laser is desirably greater than the overall (maximum) thickness Tmax of such plurality of layers.

The width of the strip or ridge forming the gain medium 516 may be chosen to be small enough to achieve single transverse mode operation. A second order output grating 522 is included to provide optical feedback into the gain medium, and to couple light out of the laser through the substrate and an output window, the output window being about the same size and shape as the outer boundary of the grating 522. The grating 522 and associated output window may be tailored to have any desired length, for example, short to provide an output beam made to resemble a point source, or long to provide an output beam made to resemble a line source.

In the case of FIG. 5, the SE-DFB laser 510 is designed for attachment to the body 530. The body 530 may be a head such as a magnetic recording head, and may include a relatively thick substrate 532 on which is disposed a plurality of thin layers 533. The layers 533 may include a plurality of magnetic layers 534 tailored to form, for example, a magnetic write pole and an optional magnetic read device, the structure of which is not shown in FIG. 5 for simplicity and generality. Besides the magnetic layers 534, additional thin layers may be provided on the substrate 532 to form optical structures such as at least a waveguide and an NFT. The waveguide and NFT may be formed on the body 530 such that the laser 510, if flipped over, mounted atop the body 530 as indicated in the figure, and properly aligned, injects laser light from the output window of the laser into the waveguide towards the NFT. The waveguide may be defined by a core layer 538 sandwiched between cladding layers 536, 540, all of these layers being transmissive to the laser light. The cladding layers have lower refractive indices than the core layer 538, and they may have isotropic refractive indices or they may have graded refractive indices, as desired. An optional overcoat layer 542 may also be provided for mechanical protection of the waveguide and/or for other purposes. The NFT, not shown in FIG. 5 but shown schematically below in FIG. 7a, may be embedded in the optical layers proximate the waveguide, e.g., in the core layer 538, in the cladding layer(s) 536, 540, and/or in the overcoat layer 542.

The portion of the waveguide visible from the perspective of FIG. 5 is an edge of the waveguide, the edge connecting two opposed major surfaces (larger than the edge surface) of the waveguide which each extend perpendicular to the plane of the figure. This waveguide edge is long and narrow. The shape of the output window (and output coupler 522) of the laser 510 is also made to be long and narrow in order to better match the shape of the waveguide edge. As a result, good end-fire coupling of the laser 510 to the waveguide edge can be realized with a relaxed tolerance on the placement of the laser 510 on the body 520 along the length axis, i.e., along the in-plane axis parallel to the long dimension of the waveguide edge. Tolerances on placement along an orthogonal width axis (an in-plane axis perpendicular to the length axis) are likely more stringent due to the smaller feature dimensions along that axis for both the laser and the waveguide. The laser may, for example, emit light from an output window having a length in a range from about 20 to 60 microns, and having a width in a range from about 1 to 5 microns, or about 3 microns. Similarly, the edge of the waveguide may, for example, have a length in a range from about 2 to 100 microns, and a width in a range from about 1 to 5 microns, or about 3 microns. In such cases, alignment of the laser with the waveguide may be achieved without the need for sub-micron positioning tolerance at least along the length axis.

Figure 5A:
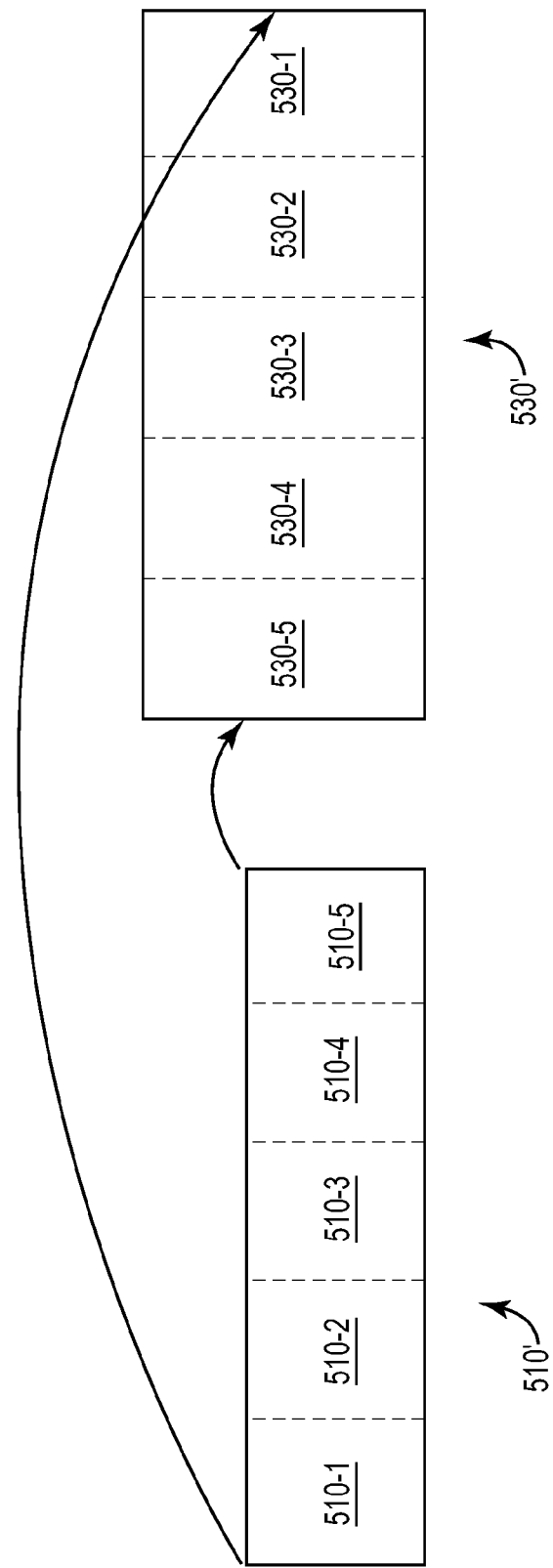
FIG. 5a is a schematic top or plan view showing how multiple SE-DFB laser devices can be attached to multiple body devices in a batch process using bars or strips of devices.

Since the laser 510 and the head or body 530 may be made using larger wafer-scale components and batch fabrication techniques, it is often possible to carry out the coupling depicted in FIG. 5 in a batch process using bars or strips of devices. Such batch coupling is shown schematically in FIG. 5a. Here, a bar 510' or strip is batch processed from a larger wafer so as to contain a row of contiguous devices 510-1, 510-2, 510-3, 510-4, 510-5, where each such device may be the same as laser 510 of FIG. 5. Similarly, another bar 530' or strip is batch processed from a larger wafer so as to contain a row of contiguous bodies 530-1, 530-2, 530-3, 530-4, 530-5, where each such body may be the same as body 530 of FIG. 5, and the spacing of the individual bodies in bar 530' is the same as the spacing of the individual devices in bar 510'. Attachment of device 510-1 to body 530-1, and of device 510-2 to body 530-2, and so forth can then be simultaneously performed by aligning the bar 510' to the bar 530', and then securing the bars together in a lasting bond. In an exemplary embodiment, a first carrier piece can be used to hold the bar 510' during alignment and energize the SE-DFB lasers in the bar. One or more microscopes can be directed at a bottom surface of the bar 530' to observe or otherwise measure any laser light exiting the waveguides so as to monitor alignment along one in-plane direction. In the orthogonal in-plane direction, alignment may be achieved using one or more alignment guides as discussed below in connection with FIG. 6.

Figure 6:
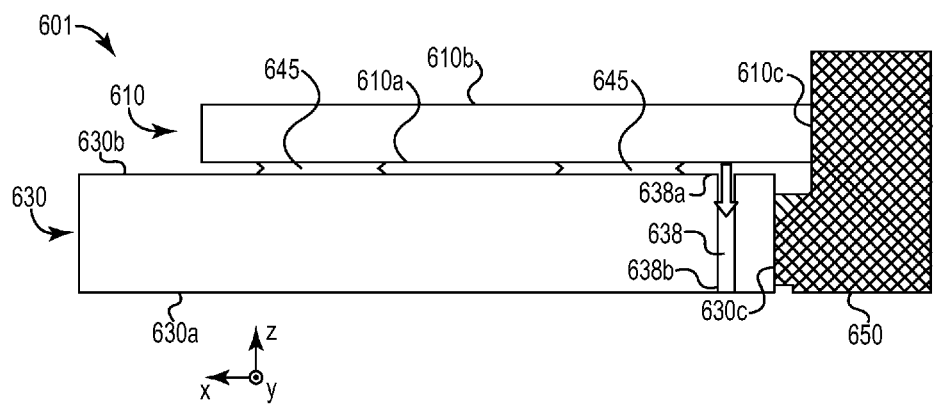
FIG. 6 is a schematic side or cross-sectional view of a head in which an SE-DFB laser is mounted atop a body having a waveguide, the figure also showing an alignment guide for aligning the laser and the body along one axis or direction.

A technique for aligning the laser with the body, and attaching the laser to the body, is depicted schematically in FIG. 6. In the figure, an SE-DFB laser 610 is aligned with and bonded to a body 630. The laser 610 may be similar to or the same as any of the lasers discussed elsewhere herein, including in particular the laser 510 of FIG. 5. The body 630 includes at least a waveguide 638 and an NFT, and may also include magnetic devices and structures such as a magnetic write pole with associated windings, and a magnetic read element. The body 630 may be similar to or the same as the body 530 of FIG. 5. The bodies 630, 530 may be or comprise sliders, i.e., devices configured to "float" in close proximity to a writeable media via an air bearing, the writeable media typically rotating or otherwise in a state of rapid relative motion with respect to the slider. Such an arrangement is depicted below in FIG. 9.

One or more bonding elements 645, such as solder bump(s) or bead(s) of a curable epoxy or adhesive, are used to secure the laser 610 to a surface of the body 630 such that the laser light emitted from the major surface of the laser is efficiently coupled to the waveguide and the NFT in or on the body. Preferably, the bonding element(s) can transition from an initial soft state, e.g., a melted or uncured state, to a final hardened state, e.g., a solidified or cured state. While the bonding elements 645 are in the soft state, coarse and fine adjustments can be made to the relative position of the laser 610 and the body 630. After position adjustments are complete, the bonding elements 645 may be hardened to provide a firm, lasting bond, allowing the combination to be manipulated (e.g. by attachment to a pivot arm or other structure) without disrupting the alignment between the laser and the body.

Position adjustments can be made while the bonding elements are soft, and can include both passive and active alignment. As mentioned above, tolerances along different directions may not be the same. In other words, a given amount of deviation relative to an optimal position may produce very different effects on coupling efficiency, depending on the direction or axis along which the deviation occurs. If the output window of the laser and/or the input region of the waveguide have shapes that are elongated or extended along an in-plane length axis, such as shown in FIG. 5, larger deviations along that axis may be deemed acceptable compared to deviations along an orthogonal in-plane (e.g. width) axis. In some cases, one or more precision tools such as alignment guide 650 may be used to ensure accurate positioning of the laser relative to the body 630 and waveguide 638. The alignment guide 650 may have one or more surfaces that are precisely formed and tailored to engage corresponding surfaces of the components to be aligned and bonded. In FIG. 6, the guide 650 has one surface that engages a side surface or edge 610c of laser 610, and another surface that engages a side surface or edge 630c of body 630. With appropriate design of the guide 650, sliding the laser 610 into position atop the body 630 using the guide 650 may ensure good alignment along the more sensitive in-plane axis, e.g., the width axis, and/or along any other suitable axis. The edge 610c may, for example, be the same as or similar to edge 510c of laser 510: due to the narrowness of the waveguide input region and of the laser output window along an in-plane axis perpendicular to this edge, position errors or deviations of the laser along that axis may be most sensitive. Since the alignment guide contacts the edge of the laser chip rather than the actual output window of the laser, positional accuracy of the laser output window may be enhanced by careful control of the distance from the laser output window to this edge, which is oriented parallel to the elongated output window. Careful control may in some cases be ensured by forming the edge 610c, 510c completely or partially by etching rather than entirely by other techniques such as sawing or cleaving. The etched edge 610c, 510c may then be used in connection with an alignment guide for more precise positioning of the laser output window relative to the input region of the waveguide.

In FIG. 6, the side surface or edge 610c connects opposed major surfaces 610a, 610b of the SE-DFB laser 610. Laser light is emitted from the output window located at the surface 610a, the output window being defined by an output grating. Alignment guide 650 can be employed to ensure the output window is properly positioned relative to the body 630 such that the output beam of the laser is efficiently injected into the waveguide 638 formed in the body 630. In the case of FIG. 6, laser light injection is by end-fire coupling. The body 630 may have opposed major surfaces 630a, 630b connected to each other by the side surface or edge 630c, and the waveguide 638 may have an input end 638a disposed at or near the surface 630b and a distal end 638b, to which light is conveyed, at or near the surface 630a. Laser light may be focused or concentrated at the distal end 638b by means of a solid immersion mirror (SIM), as discussed further below, or the laser light may simply be conveyed down the waveguide as in the case of a channel waveguide. The laser light is coupled to an NFT which is disposed at or near the distal end 638b, and at or near the major surface 630a.

Figure 7:
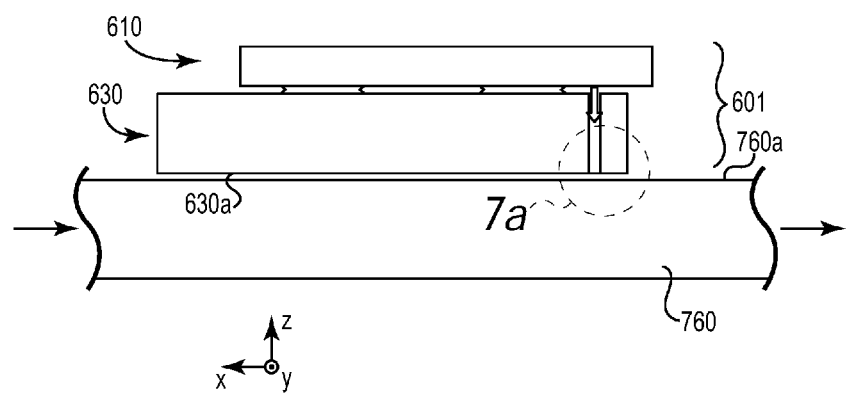
FIG. 7 is a schematic side or cross-sectional view of a system in which a head, which may be the same as or similar to that of FIG. 6, is positioned proximate a moving recording medium.

After hardening of the bonding elements 645, the laser 610 joined to the body 630 may be considered to form a modified or compound head 601. The head 601 may be adapted to operate as a recording head for recording information to a recording medium. The head 601 may in this regard be configured as a slider. As such, the major surface 630a may be shaped to provide an air bearing surface. A writeable medium in close proximity to the surface 630 so configured, and in a state of rapid relative motion with respect thereto, can cause the head 601 to maintain a stable position very close to but spaced apart from the writeable medium. Such a situation is depicted in FIG. 7. There, the head 601, supported via a pivot arm or other structure (not shown in FIG. 7), hovers close to an outer surface 760a of a writeable medium 760 which moves along the negative x-axis as shown. The reader will understand that any type of relative motion may be provided between the two bodies as desired: the medium 760 may move along the negative x-axis, the head 601 may move along the positive x-axis, or a combination thereof can be employed. As the medium 760 passes by the head 601, the laser 610 can be selectively energized in order to participate in writing information to the medium by heating selected portions of the medium. The closeup view of FIG. 7a helps to better illustrate one of many ways in which this may be carried out.

Figure 7A:
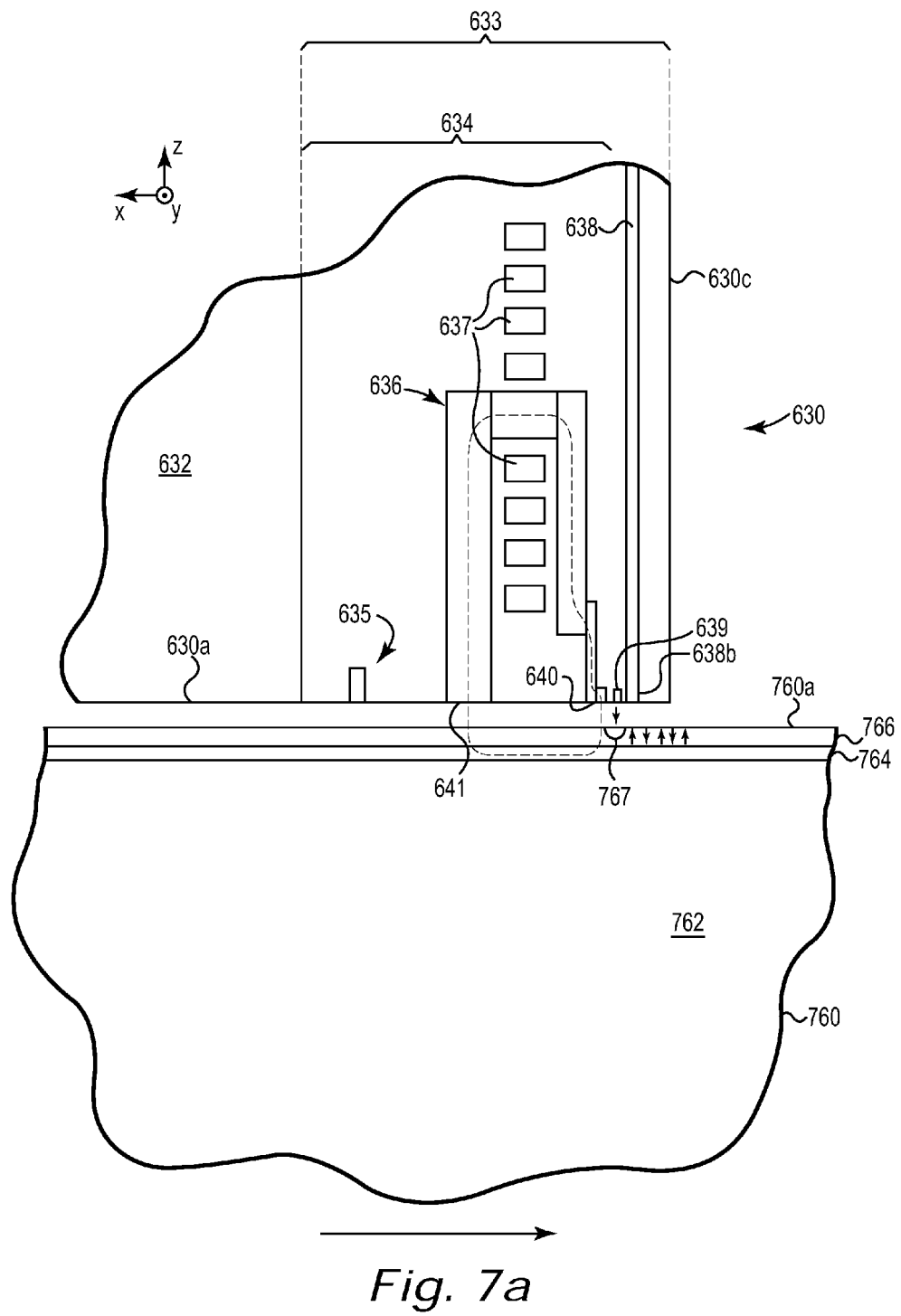
FIG. 7a is an enlarged schematic side or sectional view of a portion of the system of FIG. 7.

FIG. 7a, though also in schematic form, depicts additional structures and features that may be included in the components shown in FIGS. 6 and 7. The body 630 may comprise a relatively thick substrate 632 on which is disposed a plurality of thin layers 633. The layers 633 may include a plurality of magnetic layers 634 tailored to form, for example, a magnetic write element 636 and a magnetic read element 635, the design and fabrication of which are known generally in the art. The layers 633 are also patterned to form coils 637 which, when energized with an electrical current, produce a magnetic field (shown schematically as a circuitous dashed line) that passes through the write element 636 and through a portion of the writeable medium 760. One end or terminus 640 (referred to as a write pole) of the write element 636 may be configured to produce a high flux density of the magnetic field. Another end or terminus 641 (referred to as a return pole) of the write element 636, coupled to the write pole 640 via a yoke of the write element, may be configured to produce a lower flux density.

The writeable medium 760 may be configured in any known way, but typically it includes a plate or substrate 762 on which at least a soft magnetic underlayer 764 and a hard magnetic layer 766 are deposited or otherwise formed. The substrate 762 may be composed of a ceramic glass, an amorphous glass, or any other suitable material. The soft magnetic underlayer 764 may be made of alloys or multilayers containing Co, Fe, Ni, Pd, Pt, or Ru, or can be made of any other suitable material. The hard magnetic layer 766 may be made of FePt or CoCrPt alloys, may have a high anisotropy at ambient temperature, and may have magnetic domains that are oriented perpendicular to the plane of the layer. The perpendicular oriented domains may be employed to allow for smaller domain sizes and denser information storage than can be achieved with writeable layers whose magnetic domains are oriented parallel to the layer. A small portion or spot 767 of the layer 766 may be heated sufficiently to reduce the coercivity of the material enough so that the magnetic field from the magnetic write pole 640 is strong enough to change the magnetization direction of the recording layer. Bits of information may then be recorded in the form of an upward or downward magnetization direction for a series of magnetic domains in the layer 766.

The heating of the spot 767 in connection with the write procedure may be provided directly by an NFT 639 and indirectly by the laser 610. When the laser 610 is energized, laser light is emitted from the surface 610a towards an input end 638a of the waveguide 638. The laser light coupled into the waveguide, whether by end-fire coupling or otherwise, is conveyed to a distal end 638b of the waveguide. In some cases, the distal end may correspond to a focal point or focal region of a solid immersion mirror (SIM) or a solid immersion lens (SIL). Located at or near the distal end 638b is an NFT 639, which may be formed as part of the plurality of layers 633. The NFT utilizes plasmons to convert the power density of the focused laser light into a high power density in a near-field region that is typically smaller than the diffraction limit for the laser light. The high power density provided by the NFT in the near-field region is absorbed by the nearby writeable medium to produce localized heating of the spot 767. By positioning an emitting end of the NFT close enough to the write pole 640 of the write element 636, at least a portion of the heated spot 767 can be exposed to the high magnetic flux emitted by the write pole before passing out of range (due to the relative motion of the writeable medium 760) so that the magnetic field at the write pole is capable of changing the magnetization direction of the spot 767.

The NFT may be a suitably sized pin or other structure and may be made of a metal such as gold or other suitable materials.

Figure 7B:
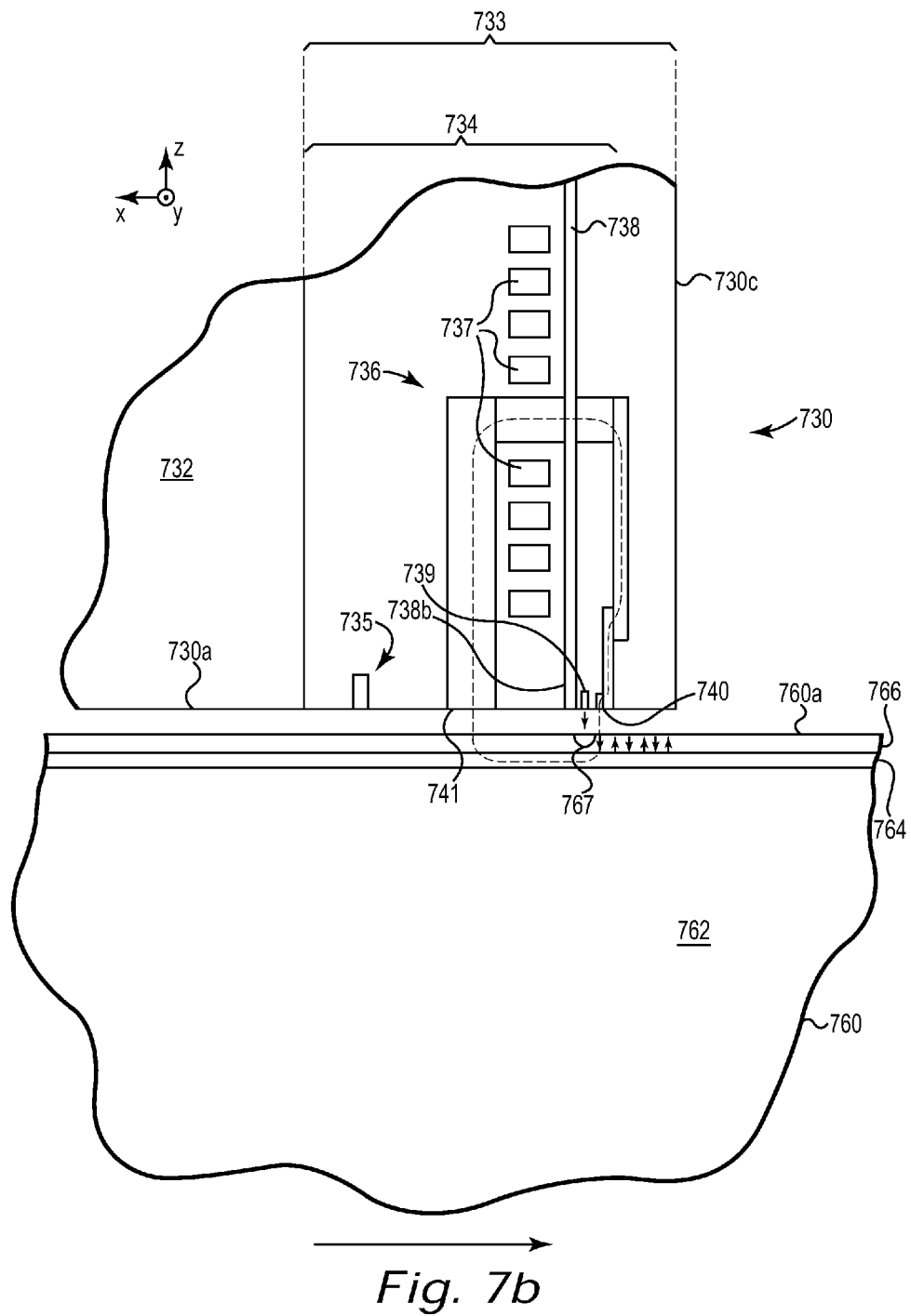
FIG. 7b is an enlarged schematic side or sectional view similar to that of FIG. 7a but for an alternative embodiment in which the waveguide and NFT are arranged differently with respect to the magnetic write pole.

An alternative embodiment to that of FIG. 7a is shown schematically in FIG. 7b. In FIG. 7b, a body 730 may be bonded to an SE-DFB laser such as any of those disclosed herein to form a modified or compound head. The head may be similar to the head 601 of FIGS. 6 and 7, except that the waveguide and NFT in body 730 are arranged differently with respect to the magnetic write pole. The head of FIG. 7b may be adapted to operate as a recording head for recording information to a recording medium. The head may in this regard be configured as a slider. As such, a major surface 730a may be shaped to provide an air bearing surface. A writeable medium in close proximity to the surface 730 so configured, and in a state of rapid relative motion with respect thereto, can cause the head to maintain a stable position very close to but spaced apart from the writeable medium, as shown in FIG. 7b. The head, supported via a pivot arm or other structure (not shown in FIG. 7b), hovers close to the outer surface 760a of the writeable medium 760 which moves along the negative x-axis as shown. The reader will understand that any type of relative motion may be provided between the two bodies as desired. As the medium 760 passes by the head, the laser can be selectively energized in order to participate in writing information to the medium by heating selected portions of the medium. The closeup view of FIG. 7b helps to better illustrate one of many ways in which this may be carried out.

The body 730 may comprise a relatively thick substrate 732 on which is disposed a plurality of thin layers 733. The layers 733 may include a plurality of magnetic layers 734 tailored to form, for example, a magnetic write element 736 and a magnetic read element 735, the design and fabrication of which are known generally in the art. The layers 733 are also patterned to form coils 737 which, when energized with an electrical current, produce a magnetic field (shown schematically as a circuitous dashed line) that passes through the write element 736 and through a portion of the writeable medium 760. One end or terminus 740 (referred to as a write pole) of the write element 736 may be configured to produce a high flux density of the magnetic field. Another end or terminus 741 (referred to as a return pole) of the write element 736, coupled to the write pole 740 via a yoke of the write element, may be configured to produce a lower flux density.

The writeable medium 760 may be substantially as described in connection with FIG. 7a, if desired, with like elements being labeled with the same reference numbers. The small portion or spot 767 of the layer 766 may be heated sufficiently to reduce the coercivity of the material enough so that the magnetic field from the magnetic write pole 740 is strong enough to change the magnetization direction of the recording layer. Bits of information may then be recorded in the form of an upward or downward magnetization direction for a series of magnetic domains in the layer 766.

The heating of the spot 767 in connection with the write procedure may be provided directly by an NFT 739 and indirectly by the laser (not shown in FIG. 7a). When the laser is energized, laser light is emitted from the emitting surface towards an input end of the waveguide 738. The laser light coupled into the waveguide, whether by end-fire coupling or otherwise, is conveyed to a distal end 738b of the waveguide. The distal end may for example correspond to the focal point or region of a solid immersion mirror (SIM) or a solid immersion lens (SIL). Located at or near the distal end 738b is an NFT 739, which may be formed as part of the plurality of layers 733. The NFT utilizes plasmons to convert the power density of the focused laser light into a high power density in a near-field region that is typically smaller than the diffraction limit for the laser light. The high power density provided by the NFT in the near-field region is absorbed by the nearby writeable medium to produce localized heating of the spot 767. By positioning an emitting end of the NFT close enough to the write pole 740 of the write element 736, the heated spot 767 can maintain a high enough temperature by the time it passes (by virtue of the relative motion of writeable medium 760) through the high magnetic flux emitted by the write pole so that the magnetic field at the write pole is capable of changing the magnetization direction of the spot 767.

Figure 8A:
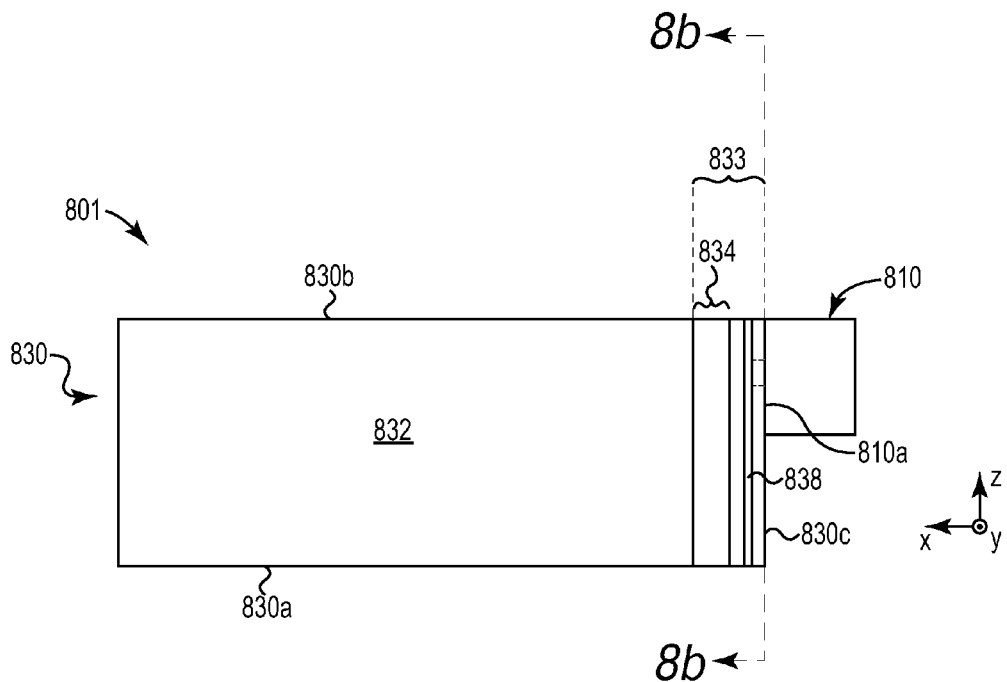
FIG. 8a is a schematic side or cross-sectional view of a head in which an SE-DFB laser is mounted on a side surface of a body having a waveguide.
Figure 8B:
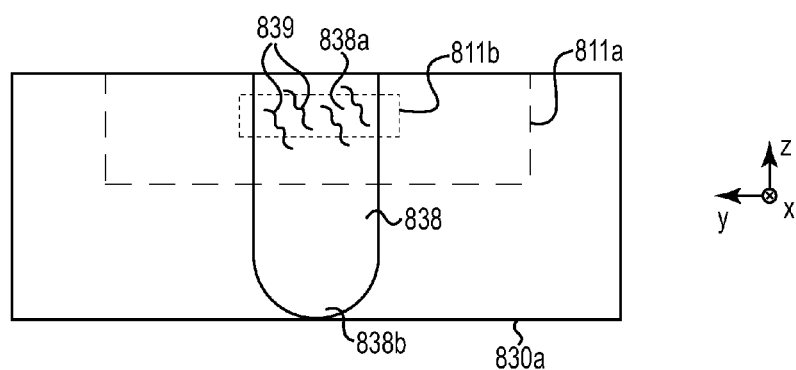

FIGS. 8a and 8b depict an alternative arrangement in which the SE-DFB laser injects light into or through a major surface of the waveguide via a coupler grating, rather than being end-fire coupled to an edge of the waveguide. FIG. 8b is a schematic view along line 8b-8b in FIG. 8a. In this embodiment, an SE-DFB laser 810 attaches to a body 830 such as a head to provide a modified or compound head 801.

The body 830 may be a head such as a magnetic recording head, and may include a relatively thick substrate 832 on which is disposed a plurality of thin layers 833. The layers 833 may include a plurality of magnetic layers 834 tailored to form, for example, a magnetic write pole and an optional magnetic read device, the structure of which is not shown in FIG. 8a. Besides the magnetic layers 834, additional thin layers may be provided on the substrate 832 to form optical structures such as at least a waveguide 838 and an NFT (not shown) disposed proximate a focal region of the waveguide. The body 830 has opposed major surfaces 830a, 830b, and the surface 830a may be or comprise an air bearing surface so that the body 830 can be maintained in close proximity to a moving writeable medium as discussed e.g. in connection with FIGS. 7, 7a, and 7b. A side surface 830c of the body 830 connects the surfaces 830a, 830b.

Rather than being mounted to the upper or major surface 830b, the SE-DFB laser 810 is mounted to the side surface 830c. Mounting structures similar to or the same as those discussed in connection with FIG. 6 may be used to provide a secure connection. The laser 810 may be the same as or similar to other SE-DFB lasers described herein. As such, the laser 810 emits light from an output window at its surface 810a based on the design of an output coupler that is also included in the laser 810. The output beam of laser light emitted from the output window impinges on one of the opposed major surfaces of the waveguide 838 rather than on a side or edge surface of the waveguide. In order to steer the laser light into and along the waveguide towards the NFT, a coupler grating, represented by grating features 839, is provided on or near the major surface of the waveguide at an input end 838a thereof. The coupled laser light propagates along the waveguide and is conveyed to a distal end 838b of the waveguide, at or near which the NFT is disposed. Just as in other embodiments described herein, the NFT utilizes plasmons to convert the focused laser light into a high power density near-field region that can produce localized heating in a writeable medium.

In the view of FIG. 8b, the in-plane shape of the waveguide 838 can be seen in relation to the footprint or outline 811a of the laser 810 and the outline 811b of the output window of the laser. The coupler grating features 839 are disposed at the input end 838a of the waveguide 838. In order to direct the laser light along the negative z-direction towards the distal end 838b rather than along the positive z-direction, the coupler grating may be a blazed grating. Alternatively or in addition, the plane of the laser output window and/or the plane of the surface 830c may be sloped so that the laser light is incident obliquely on the major surface of the waveguide so that it can be more readily directed in the desired direction, i.e., in the negative z-direction rather than the positive z-direction. An angled beam of laser light may also be achieved by placing the coupler grating on the laser itself, or on the outer surface 830c of the body 830.

Figure 8C:
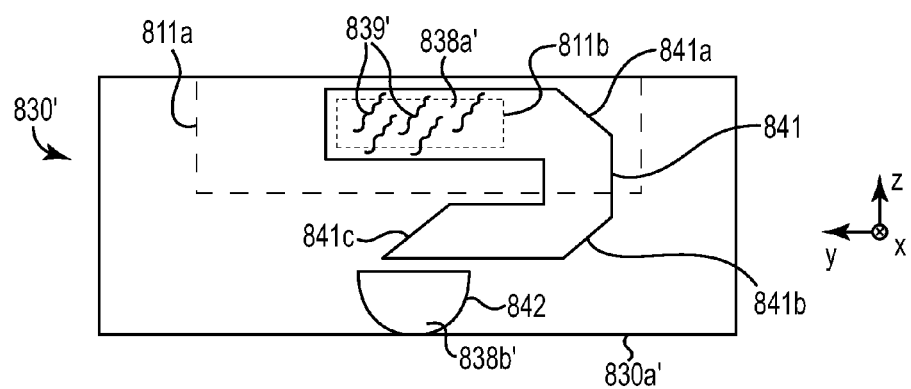
FIG. 8c is similar to FIG. 8b but for a modification of the head of FIGS. 8a and 8b.

The waveguide arrangement of the body 830 may be modified to provide a modified body 830' shown in FIG. 8c. The view of FIG. 8c is the same as that of FIG. 8b, and like reference numbers are used to designate like elements. For example, the laser may be mounted to the body 830' in the same way as with body 830, thus providing the same footprint or outline 811a and the same outline 811b of the output window of the laser. In body 830', the waveguide 838 is replaced with a compound waveguide made up of two constituent waveguides 841, 842. A coupler grating, represented by coupler grating features 839', is provided on or near the major surface of, and at an input end 838a' of, the waveguide 841 (and of the compound waveguide). The coupler grating steers laser light into the waveguide 841, which utilizes reflective facets 841a, 841b, and 841c to direct the laser light along the U-shaped waveguide 841 and into the waveguide 842, shown in the figure as a solid immersion mirror (SIM), to a distal end 838b' thereof. An NFT (not shown in FIG. 8c) is disposed at or near the distal end 838b', and at or near the outer surface 830a' (e.g. an air bearing surface of the body 830'). The waveguide geometry of FIG. 8c may be used to deliver laser light to the NFT in a transverse electric (TE) orientation, whereas the waveguide of FIG. 8b may deliver laser light to the NFT in a transverse magnetic (TM) orientation.

Comparisons and other observations can be made with respect to end-fire coupling arrangements, such as those of FIGS. 6 and 7, and side-coupling arrangements, such as that of FIGS. 8a, 8b, and 8c.

In end-fire coupling arrangements, a wide output beam of laser light can be used to provide a good match to the input end of the waveguide. The output profile of the laser beam can also be adjusted to achieve various objectives. For example, the laser output beam can be made to be very wide in a cross-track direction (i.e., perpendicular to a direction of relative motion between the head and the magnetic media, see e.g. the y-axis in FIGS. 7a and 7b), in some cases even wider than the input end of the waveguide, whereupon the excessively wide output beam can be focused down to match the input end of the waveguide using components such as a mode index lens, a tapered waveguide, and/or a diffractive optic using gratings in the waveguide. The focusing in the cross-track direction to reduce the width of laser output beam to match a smaller width input end of the waveguide could also come from the grating in the laser. In another example, output grating(s) in the laser can be tailored such that laser light is only emitted from selected portions of the output window. This may be used to match the laser output with an intensity profile that most efficiently excites the resonance of the NFT. For example, a double Gaussian intensity profile with appropriate separation between Gaussian envelopes may be called for some configurations of the waveguide and write pole. If the waveguide is arranged such that it is bisected or otherwise intersected or split by the write pole, the intensity profile may be tailored so that little or no laser light is emitted in a region corresponding to the split. In general, the intensity profile of the laser output can be made to more efficiently match the ideal input mode profile for the waveguide.

Some benefits associated with end-fire coupling configurations may include a low vertical height of the SE-DFB laser compared to an edge-emitting laser standing on its end. The SE-DFB laser can be made very thin, e.g., less than 150 microns, and as such it can be mounted or stacked on top of the head or slider without a large increase to overall height. The intensity profile of the laser output can also be adjusted for enhanced coupling efficiency as discussed above. Long lifetimes of the SE-DFB laser may also be realized due to the relatively low power density of laser light at the output grating and at the output window: the output grating is typically much larger than the end facet of an edge-emitting laser diode, and the SE-DFB laser may incorporate no cleaved facets. The output beam of the SE-DFB laser can be as wide as the waveguide input end or opening, and thus, additional conditioning optics in the head slider may be avoided.

Some benefits associated with side-coupling arrangements may include at least some of those mentioned above in connection with end-fire coupling, e.g., longer lifetimes and the ability to customize the intensity profile of the output. Furthermore, in side-coupling arrangements the output beam of the laser may be made to be as wide as the input end or mouth of the waveguide or SIM, while the dimension of the output beam in the orthogonal direction can be much narrower. This can lead to high coupling efficiency, and can minimize the amount of beam conditioning that needs to be done within the waveguide on the head.

As described elsewhere herein, the SE-DFB laser can be mounted to the head using materials such as solder or adhesives. Alignment of the laser to the waveguide can be done using solder reflow and solder pads that are aligned to the optics, fiducials fabricated on the laser and head, mechanical guides on the laser and/or head, and/or active optical feedback from the light coupled into the waveguide. The phase of the light in the waveguide can be adjusted to give a split linear polarization, if needed for the NFT, by adjusting one side of the waveguide or SIM, or by adjusting the mode index of a portion of the waveguide by changing or altering the material, or by increasing the thickness. The NFT may be placed at the focus of the SIM for additional focusing.

Figure 9:
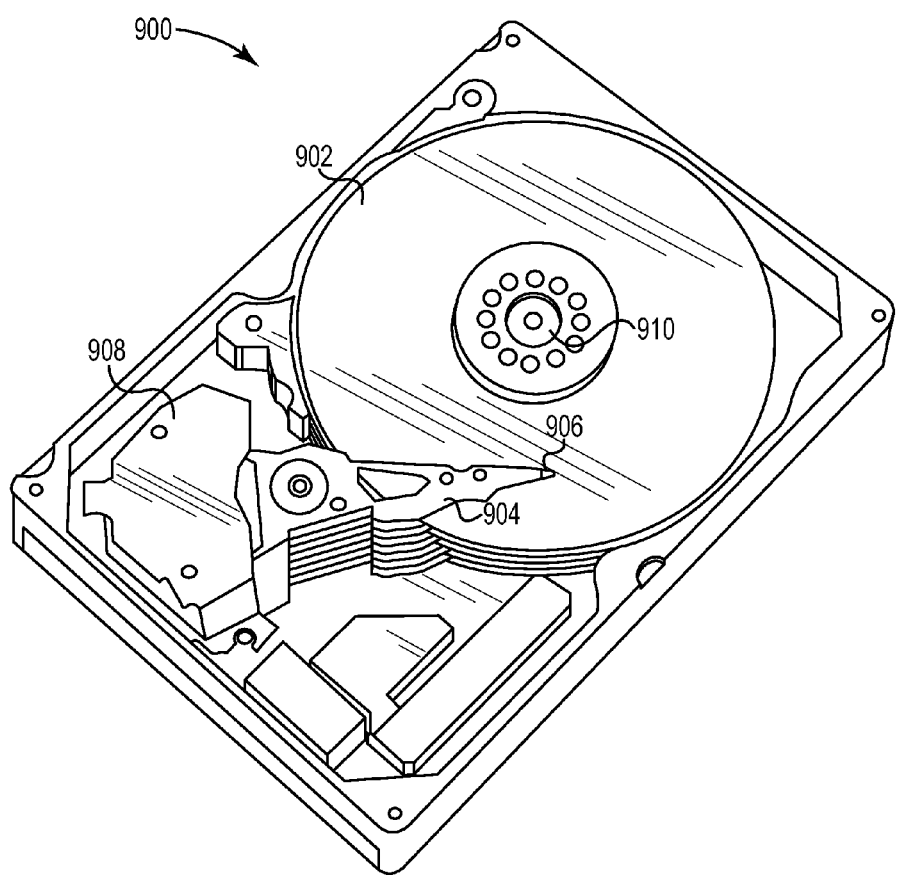
FIG. 9 is a schematic perspective view of a hard drive apparatus that may incorporate any of the heads disclosed herein.

The structures and techniques described herein may be used, for example, in read/write heads of a magnetic data storage device such as hard drive apparatus 900 shown in FIG. 9. The apparatus 900 generally includes at least one magnetic disk 902 that rotates around a spindle axis 910. The apparatus 900 further includes an arm 904 with an end-mounted a transducer head 906 that is positioned over a surface of the disk while reading from or writing to the disk 902. The arm 904 is driven by an actuator 908 to move radially across the disk 902. This movement of the arm 904 positions the transducer head 906 over the disk 902 to read from or write to tracks on the disk 902. A hard drive of this type may include multiple arms 904 and disks 906 arranged in a stack formation, and may include transducer heads that read/write from/to both surfaces of the disks 902.

The transducer head 906 (also referred to as a "slider") may include both magnetic read and write elements. A read element generally operates by detecting a changing magnetic field, e.g., changes in direction of magnetic flux caused by relative motion between an encoded magnetic media and the read element. The read element converts the flux reversals into an electrical analog signal that represents data stored on the media. The write element operates in response to a current sent through a conductor surrounding a write pole, which generates a magnetic field at a tip of the write pole. This magnetic field in turns changes the orientation of a local magnetic field at the surface of the disk 902, causing data to be persistently stored on the disk 902.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A head, comprising:
   a body having opposed first and second surfaces;
   a waveguide adapted to receive light and convey the light to a distal end of the waveguide;
   a near field transducer (NFT) disposed proximate the distal end of the waveguide and having an output end proximate the first surface of the body; and
   a surface-emitting distributed feedback (SE-DFB) laser attached to the body and positioned to inject laser light into the waveguide.

2. The head of claim 1, wherein the laser is configured to operate in a single spatial mode.

3. The head of claim 1, wherein the laser includes an active region extending from a first reflective end to a second reflective end, the active region also comprising an intermediate portion disposed between the first and second ends, and wherein the laser includes a grating coupled to the intermediate portion of the active region to define an output region of the laser.

4. The head of claim 3, wherein the output region is elongated along an axis, and wherein the laser is formed on a chip substrate having an etched edge oriented parallel to the axis of elongation.

5. The head of claim 1, wherein the laser includes two opposed reflective ends defining therebetween a cavity length, wherein the laser is included in a plurality of layers formed on a chip substrate, the plurality of layers having a maximum thickness Tmax, and wherein the cavity length is greater than Tmax.

6. The head of claim 1, wherein the first surface of the body is an air bearing surface, and wherein the laser is disposed on the second surface of the body.

7. The head of claim 1, wherein the first surface of the body is an air bearing surface, and wherein the laser is disposed on a third surface of the body that connects the first surface to the second surface.

8. The head of claim 1, wherein the waveguide comprises a solid immersion mirror (SIM), and the distal end of the waveguide comprises a focal region of the SIM.

9. The head of claim 1, wherein the waveguide comprises opposed major surfaces and an end surface connecting the major surfaces.

10. The head of claim 9, wherein the waveguide defines a waveguide plane oriented perpendicular to the second surface of the body, and wherein the end surface is elongated along an axis that is parallel to the waveguide plane.

11. The head of claim 9, wherein the laser is positioned to inject the laser light into the waveguide through the end surface.

12. The head of claim 9, wherein the laser is positioned to inject the laser light into the waveguide through one of the major surfaces.

13. The head of claim 9, wherein at least one of the opposed major surfaces has a grating formed thereon, and wherein the laser has an output region positioned to direct the laser light onto the grating.

14. The head of claim 1, wherein the NFT is adapted to provide a surface plasmon-enhanced near-field radiation pattern proximate the NFT output end in response to the laser light received by the waveguide.

15. The head of claim 1, wherein the body is a slider and the first surface is an air-bearing surface.

16. The head of claim 1, further comprising a magnetic write pole, the waveguide and the NFT being disposed proximate the write pole.

17. A method, comprising:
generating laser light from a surface-emitting distributed feedback (SE-DFB) laser;
coupling the laser light into a waveguide having a distal end; and
delivering the coupled laser light to a near field transducer (NFT) disposed proximate the distal end, the NFT being configured to provide electromagnetic heating in response to the delivered laser light.

18. The method of claim 17, wherein the SE-DFB laser is mounted on a head that comprises the waveguide and the NFT, and wherein the NFT is configured to provide the electromagnetic heating to a medium spaced apart from the head.

19. A system, comprising:
a surface-emitting distributed feedback (SE-DFB) laser;
a waveguide coupled to receive laser light from the SE-DFB laser and to convey the laser light to a distal end of the waveguide; and
a near field transducer (NFT) disposed proximate the distal end and configured to provide electromagnetic heating in response to the laser light.

20. The system of claim 19, further comprising:
a magnetic write pole disposed proximate the NFT.

\* \* \* \* \*